J. B. CARD & F. McARDLE.
APPARATUS FOR TREATING WOODEN BLOCKS.
APPLICATION FILED AUG. 15, 1913.
1,109,653.
Patented Sept. 1, 1914.
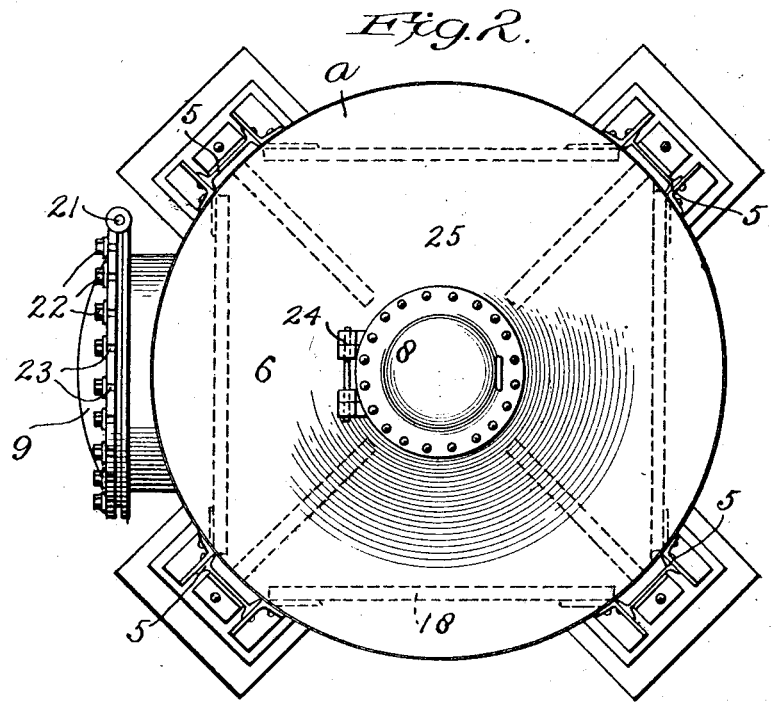
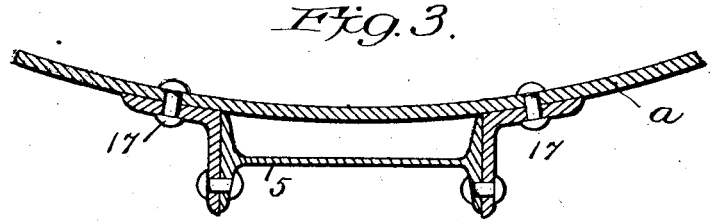
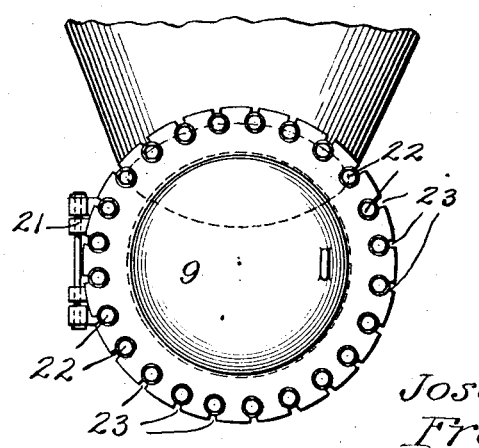
Inventors
Joseph B. Card
Frank McArdle
By Victor J. Evans
Attorney

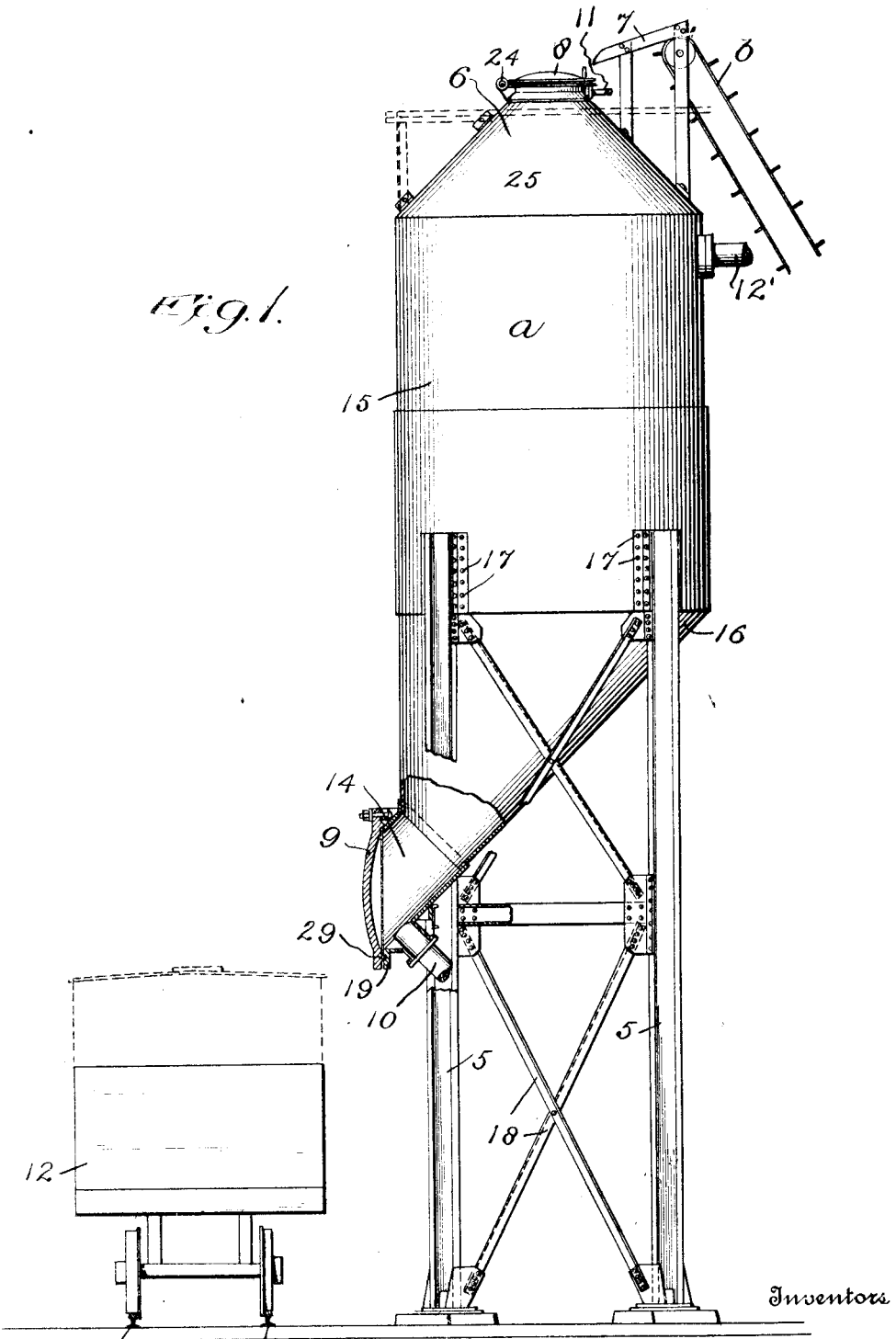

UNITED STATES PATENT OFFICE.

JOSEPH B. CARD, OF HIGHLAND PARK, ILLINOIS, AND FRANK McARDLE, OF TERRE HAUTE, INDIANA.

APPARATUS FOR TREATING WOODEN BLOCKS.

1,109,653.     Specification of Letters Patent.     Patented Sept. 1, 1914.

Application filed August 15, 1913. Serial No. 785,010.

*To all whom it may concern:*

Be it known that we, JOSEPH B. CARD and FRANK McARDLE, citizens of the United States, residing at Highland Park and Terre Haute, respectively, in the counties of Lake and Vigo, respectively, and States of Illinois and Indiana, respectively, have invented new and useful Improvements in Apparatus for Treating Wooden Blocks, of which the following is a specification.

The general object of the invention is to effect the transfer of impregnated material, such as wood, from the treating tank to a receptacle, such as a car, in a simple, effective and expeditious manner. And to this end the invention resides in the light of an improvement on apparatus for treating wooden blocks as set forth in Letters-Patent of the United States, granted to use Feb. 28th, 1911, and numbered 985,392. In that patent the apparatus included a treating tank and a conveyer located directly below the treating tank and extended at one end so as to move the material deposited thereon from the tank, into a car disposed at a point laterally beyond the tank. With the present invention the conveyer mechanism is eliminated and the tank itself adapted for delivering its contents directly into a car disposed beyond one side of the tank.

Other objects will appear and be better understood from that embodiment of our invention of which the following is a specification, reference being had to the accompanying drawings forming part hereof, in which:—

Figure 1 is a side elevation partly in section of the tank and its support. Fig. 2 is a detail plan of the tank. Fig. 3 is a detail horizontal section taken through the lower portion of the tank and through one of the upright supports for the same. Fig. 4 is a detail front elevation of the outlet end portion of the tank.

The tank $a$ which forms one of the subjects of the present invention, is formed of metal and herein shown as positioned upright and supported by a frame made up of the uprights 5—5. The upper end portion 6 of the tank has an inlet opening which is positioned with such relation to one end of a conveyer mechanism $b$ as to receive the material discharged from the chute 7 of the conveyer. The conveyer $b$ extends from a point where the material is prepared for treatment in the tank $a$. The material which the conveyer carries to the tank $a$ may consist of any class of wooden objects which are usually impregnated with a preservative. In the present instance, the apparatus is designed for a treatment of wooden paving blocks and upon directing a quantity of these into the tank $a$ and sealing with the covers or closures 8 and 9, the inlet and outlet openings respectively, of the tank, the contents of the tank are then treated in accordance with any of the well-known processes employed for impregnating wood. For purpose of illustration we have shown the tank adapted for use with a process, which, broadly stated, consists in first softening the blocks then creating a vacuum in the tank and finally introducing the impregnating fluid into the tank and circulating the same therein at a substantially constant heat and under-pressure.

Referring now to the drawings, 10, 11, and 12' indicate fragments of conveyers in the form of pipes and connected to the tank. It will, of course, be understood that in so far as the purpose of our present invention is concerned, the dispositions of these pipes or their points of connection to the tank, are immaterial. The pipe 10 is adapted to function as a drain and is also connected to the pipe 12', the connection to the latter pipe being made through a compressor and a heating chamber (not shown). The pipe 10 is also connected to a vacuum pump and the pipe 11 is connected to a source of steam supply. It will, of course, be understood that these pipes are provided with the usual valve fittings for controlling passage through the pipes. Upon introducing steam into the tank through the pipe 11, for instance, the valves in the other pipes are closed until such time as the steam has effected the softening of the blocks. This done, the supply of steam is cut off and a valve (not shown) in the pipe 10 opened to permit the steam to escape. Upon closing the last-named valve the vacuum pump (not shown) is started and the controlling device (not shown) between the said pump and the tank, operated to render the vacuum pump effective in creating the desired percentage of vacuum in the tank and in the blocks therein. The preservative fluid is then forced into the tank under compression through the pipe 10, (the passage through pipe 11 being first cut off) and the valve (not shown) in the pipe 12' opened. It will be observed that the point of connection of the pipe 12' to the tank a is such that the impregnating fluid after rising above the level of the contained blocks, will find an outlet through the said pipe 12 and thus be prevented from entering the other pipes of the system located in the upper end portion of the tank. The provision of the heat drum (not shown) and its connection with the pipes 10 and 12', effects the circulation of the impregnating fluid through the tank and maintains such fluid at a constant temperature, or substantially so. After the treatment is completed air pressure from the compressor (not shown) is introduced into the tank through the pipe 12', and the fluid remaining in the tank is discharged through pipe 10. Upon removal of the impregnating fluid from the tank the passages through pipes 10 and 12' are closed and the valve in pipe 10 opened to permit the escape of the compressed air.

By virtue of the disposition of the tank and the outlet opening thereof gravity will readily influence the blocks to pass from the tank through the outlet opening upon the removal of the closure 9 thereof. Now, when the position of the outlet end of the tank bears a certain relation to the usual receptacle into which the treated blocks are to be ultimately deposited, and the said lower end portion of the tank so constructed as to offer no impediment to the movement of the blocks toward the outlet opening, when the cover 9 thereof is removed, we find that the effective and expeditious discharging of the tank and the loading of the receptacle may be had by the action of gravity alone. Obviously from a standpoint of economy, the construction and the disposition of the tank are essential.

A convenient structure, whereby the foregoing results may be obtained, resides in arranging track rails 13—13 relatively close to one side of the supporting frame for the tank a and as will be observed by referring to Figs. 1 and 2, we position the tank so that its lower end will be above the car 12 and form this lower end so as to direct all the material passing thereinto through the outlet or discharge passage 14, which passage is disposed so as to direct the material directly into the car. The said lower end portion of the tank is herein shown as conforming in contour to the frustum of an oblique cone and the discharge passage 14 extended to a point beyond the vertical plane of the cylindrical portion of the tank and directed obliquely downward, whereby, to offer a minimum of resistance to the blocks moving in a lateral direction with respect to the tank. This particular construction will, of course, be understood as ideal with the present arrangement only and may be modified as required or as may be demanded with other obvious arrangements. Obviously the shape of the portion 16 might be other than frustaconical, for instance, curved or frustapyramidal, and still function as the structure shown.

In the present instance, the tank is shown connected to the supporting frame by rivets 17 and the said frame strengthened by the presence of truss-bars 18. A flange 19 surrounds the outlet passage 14 and forms a bearing for the closure 9 which latter is suitably adapted, such as by the presence of a circular rib 29 which coöperates with a circular groove in the flange 19, to hermetically seal the outlet passage when positioned, as shown in Figs. 1, 2 and 4. Here it will be observed that the closure 9 is connected to the tank by a hinge 21 and the said closure plate when in closed position, is locked by suitable fastening means, as clamp bolts 22 arranged in recesses 23. Like the closure plate 9, the plate 8 is connected by a hinge 24 to the upper portion 25 of the tank and is suitably adapted when closed, to seal hermetically the inlet opening of the tank.

What is claimed as new is:

1. In an apparatus for treating wooden blocks, a treating tank having an imperforate bottom inclining laterally and downwardly from one side of the tank to the other, a discharge spout having its bottom wall alined with the bottom of the tank and its free edge disposed as an entirety beyond the adjacent vertical wall of the tank, and means opening into the tank at remotely located points for maintaining a circulation of the treating medium.

2. In an apparatus for treating wooden blocks, the combination of a treating tank having an imperforate bottom inclining laterally and downwardly throughout its surface, a discharge spout having its bottom wall alined with the bottom of the tank and its free edge disposed as an entirety beyond the adjacent vertical wall of the tank, circulatory means opening into the tank at remotely located points, and conveyer mechanism for delivering material to the tank remote from the inclined bottom thereof.

In testimony whereof we affix our signatures in presence of two witnesses.

JOSEPH B. CARD.
FRANK McARDLE.

Witnesses:
HARLAN A. PRITCHETT,
HERBERT C. ANDERSON.